United States Patent [19]

Rast et al.

[11] 4,088,884

[45] May 9, 1978

[54] WIDE APERTURE OPTICAL COMMUNICATIONS DETECTOR

[75] Inventors: Howard E. Rast, Solana Beach; Hubert H. Caspers, La Mesa, both of Calif.

[73] Assignee: The United States of America as represented by the Secretary of the Navy, Washington, D.C.

[21] Appl. No.: 652,037

[22] Filed: Jan. 26, 1976

[51] Int. Cl.² .............................................. H04B 9/00
[52] U.S. Cl. .................................. 250/199; 350/290; 350/311; 350/316
[58] Field of Search ................ 250/199; 350/290, 311, 350/316, 158

[56] References Cited

U.S. PATENT DOCUMENTS

| | | | |
|---|---|---|---|
| 3,869,618 | 3/1975 | Lax et al. | 250/199 |
| 3,891,559 | 6/1975 | Rast et al. | 250/199 |
| 3,916,182 | 10/1975 | Dabby et al. | 250/199 |

OTHER PUBLICATIONS

B. Semitzky, "Narrowband Ultraviolet Vapor Filter," Jan. 1975, Applied Optics, pp. 238–243.

*Primary Examiner*—Benedict V. Safourek
*Assistant Examiner*—Edward L. Coles
*Attorney, Agent, or Firm*—R. S. Sciascia; G. J. Rubens; T. M. Phillips

[57] ABSTRACT

Narrow-band detection of optical signals over a large field of view wherein the selective reflecting power of metallic vapors is employed. A modulated carrier signal to be detected is directed to a Brewster window of an enclosure containing a vapor such as mercury. Only the incident light of interest is reflected through an exit window and detected by means of a photo-multiplier.

2 Claims, 3 Drawing Figures

WIDE APERTURE OPTICAL COMMUNICATIONS DETECTOR

BACKGROUND OF THE INVENTION

The laser has now been adopted as a powerful transmitter in optical communication systems. The laser operating at frequencies on the order of $10^{15}$Hz, greatly expands the information transmission capabilities of communicating systems, because the rate at which information is transmitted is proportional to the bandwidth of the carrier. Carrier bandwidths at optical frequencies are several thousands of times larger than ordinary high frequency communications carrier bandwidths, and therefore promises significant improvement in communication system capabilities. The high degree of beam collimation in lasers provides additional advantages in reducing the size of transmitter and receiver antenna. In the development of receivers the problem of selectivity, selectively discriminating signal information in the presence of wide background noise has been encountered. For example, a signal transmitted at or about $6 \times 10^{14}$Hz during daylight will be accompanied by ambient scattered sunlight and, at night by man-made emissions such as illumination or reflected moonlight.

In order to filter background noise from transmitted signals it is necessary to selectively filter the information carrier frequency. There have been several attempts of providing the required high selectivity in the visible spectrum such as optical interference filters and Fabry-Perot etalons. These highly selective filters depend on the multiple reflection and interference of light waves between parallel plates. In the case of the Fabry-Perot etalon, considerable spectral narrowing of the transmitted light is achieved, but the transmitted intensity is enormously reduced. To the disadvantage of the optical communications, both of these instruments must be used close to normal incidence and are not useful as high-Q filters for large aperture systems.

SUMMARY OF THE INVENTION

The present invention provides for a practical and convenient method and apparatus for detecting optical communications in the presence of background noise. An optical transmitter for transmitting an electro-optically modulated laser beam at a predetermined frequency is directed to an electro-optical receiver. The electro-optical receiver has a filter in which the incident transmitted light signal enters and is strongly reflected at the fundamental absorption frequency of the material contained in the filter. This fundamental absorption frequency is also the frequency of the transmitted light signal. The reflected signal at the transmitted frequency is then detected in the usual manner.

Accordingly, an object of the invention is the provision of a practical and convenient optical communication system wherein the transmitted signal may be detected in the presence of noise.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
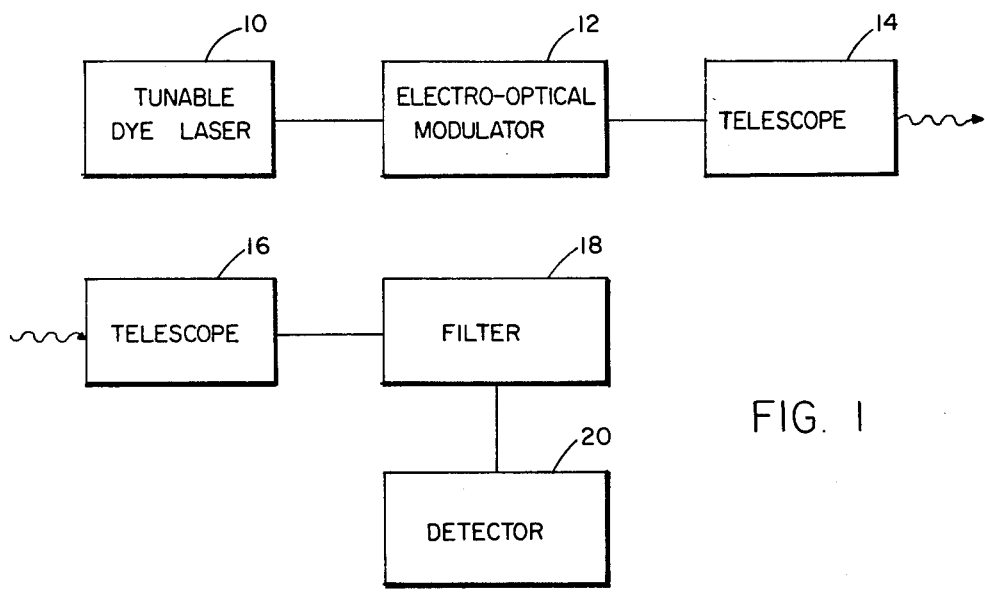
FIG. 1 is a block diagram of an optical communication system.

Referring now to the drawings wherein there is shown in FIG. 1 a tunable dye laser 10 which may be tuned to the desired frequency, the output of which is fed to an electro-optical modulator 12 wherein the laser beam is modulated in any well known manner and focused by means of a telescope 14 for transmission through a medium such as water or the atmosphere. A receiving telescope 16 receives the transmitted signal and focuses the received signal into a filter 18 wherein only the received energy at the frequency of the laser beam is reflected and all other energy is passed. The reflected energy is directed to a detector 20 for detection of the modulated signal in the usual manner.

Figure 2:
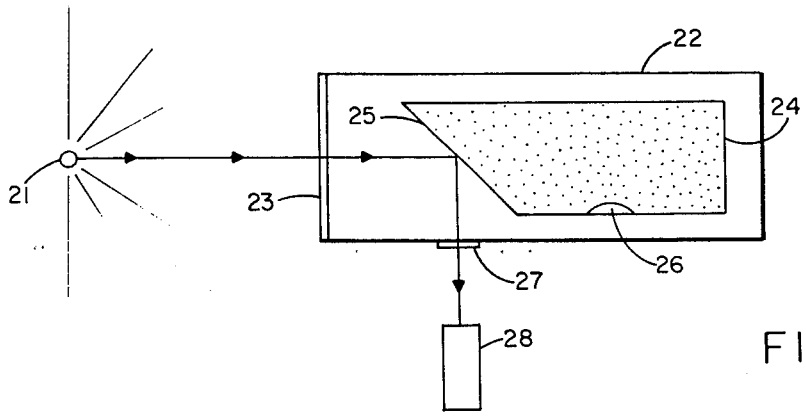
FIG. 2 shows a mercury vapor filter for use in FIG. 1.

FIG. 2 shows a filter which will accomplish the function of filter 18 in FIG. 1. The received signal 21 is the modulated carrier signal to be detected. An oven 22 which may be heated in any well known manner contains an enclosure 24 containing mercury 26 which when heated forms a mercury vapor. Light 21 enters enclosure 24 through a Brewster angle window 25 and is strongly reflected at the fundamental absorption frequency through the exit window 27 and is detected by means of detector 28 which may be a photo-multiplier or any other optical detector.

In operation the proper operation of the apparatus depends upon the anomalous dispersion affect which refers to the behavior of light when incident upon or transmitted at frequencies close to a strong absorption band in matter. The simplest theory of reflection from absorbing media at normal incidence relates the reflectivity to the refractive index $n$ and the absorption index $k$ of an optically homogeneous surface using randomly polarized light, $$R = \frac{(n-1)^2 + k^2}{(n+1)^2 + k^2} \tag{1}$$

According to this theory, the dielectric constant near the absorption line is represented by, $$\epsilon(\omega) = \text{constant} + \frac{A}{1 - \left(\frac{\omega}{\omega_0}\right)^2 - iB\left(\frac{\omega}{\omega_0}\right)} \tag{2}$$

where A and B are constants. The dielectric function is complex and related to $n$ and $k$ by $$\epsilon(\omega) = n^2 - k^2 + 2ink \tag{3}$$

Figure 3:
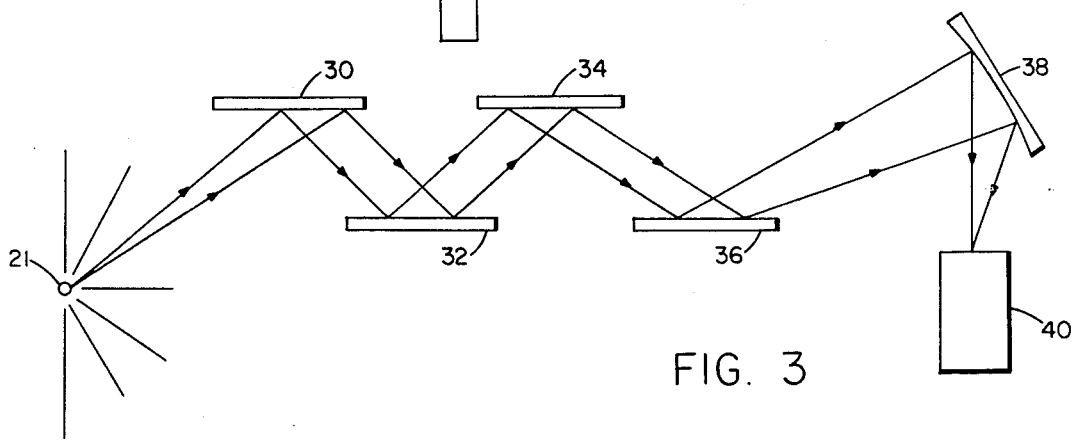
FIG. 3 shows a fuchsine dye filter for use in FIG. 1.

The essential feature arising from analysis of this theory is that there is intense reflection of light from materials at frequencies near the fundamental absorption band $\omega_0$. Filter 18 then may be as shown in FIG. 2 or may be of the optical arrangement shown in FIG. 3 which is similar to a Reststrahlen filter fabricated in the manner described on p516 of *Physical Optics* by R. W. Wood, third revised edition (Dover edition, 1967). Mirrors 30, 32, 34, and 36 are fabricated of fuchsine dye crystals made in the manner described on p843 of *Organic Chemistry* by L. F. and M. Fieser, D. C. Heath and Company (1944) and deposited on substrates of either metal glass or dielectric. The Reststrahlen filter of FIG. 3 is arranged as shown so that the source of energy 21 is successively reflected from mirrors 30, 32, 34, and 36. As the energy is reflected from each mirror, the energy outside the energy band at which the fuchsine dye is absorbing is attenuated and the energy at the absorbing band of fuchsine is strongly reflected. After the multiple reflections from mirrors 30, 32, 34, and 36 the signal is reflected by an off-axis conic section mirror 38 onto the photo-cathode of a photo-multiplier 40.

When the mercury vapor filter of FIG. 2 is used, dye laser 10 could be a pulsed tunable dye laser whose output is harmonically doubled to provide the required frequency (2537A°) to match the absorbing resonant frequency of mercury. When the fuchsine filter of FIG. 3 is used, dye laser 10 could be a tunable dye laser tuned to emit at approximately 5000A°.

Obviously many modifications and variations of the present invention are possible in the light of the above teachings. It is therefore to be understood that within the scope of the appended claims the invention may be practiced otherwise than as specifically described.

What is claimed is:

1. In an optical communication system, the combination comprising:
   (a) an optical transmitter for transmitting an electro-optically modulated laser beam at a predetermined frequency;
   (b) an optical receiver including housing means for receiving said modulated laser beam of energy;
   (c) filter means positioned within said housing means for intercepting said optically transmitted laser beam, said filter means including fuchsine dye crystals which reflect energy of the same frequency as said modulated laser beam and which attenuates background noise outside said predetermind frequency;
   (d) detecting means positioned to intercept said reflected energy for detecting said transmitted signal.

2. The system of claim 1 wherein said housing means contains mirrors in a Reststrahelen arrangement, said mirrors having said fuchsine dye crystals as the reflecting material.

* * * * *